No. 823,019. PATENTED JUNE 12, 1906.
M. F. ADAMS.
LIQUID FILTER AND PURIFIER.
APPLICATION FILED JUNE 10, 1905.
2 SHEETS—SHEET 2
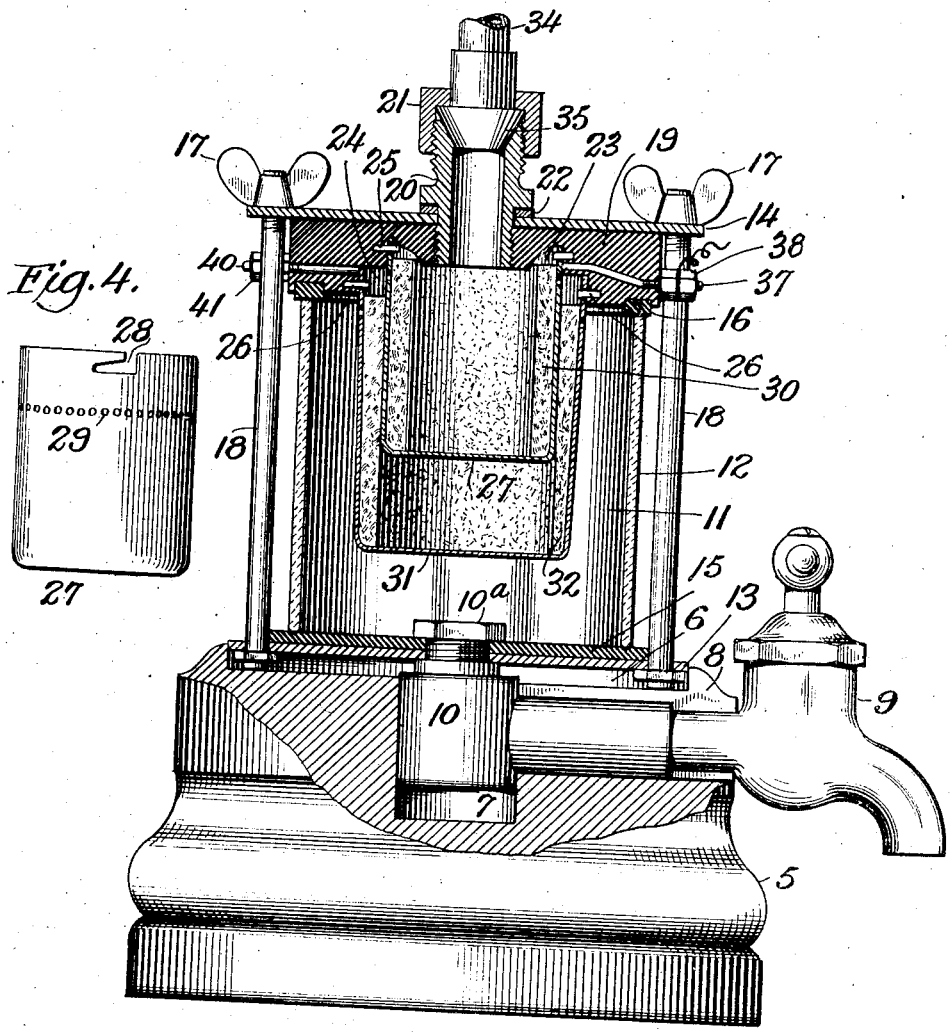

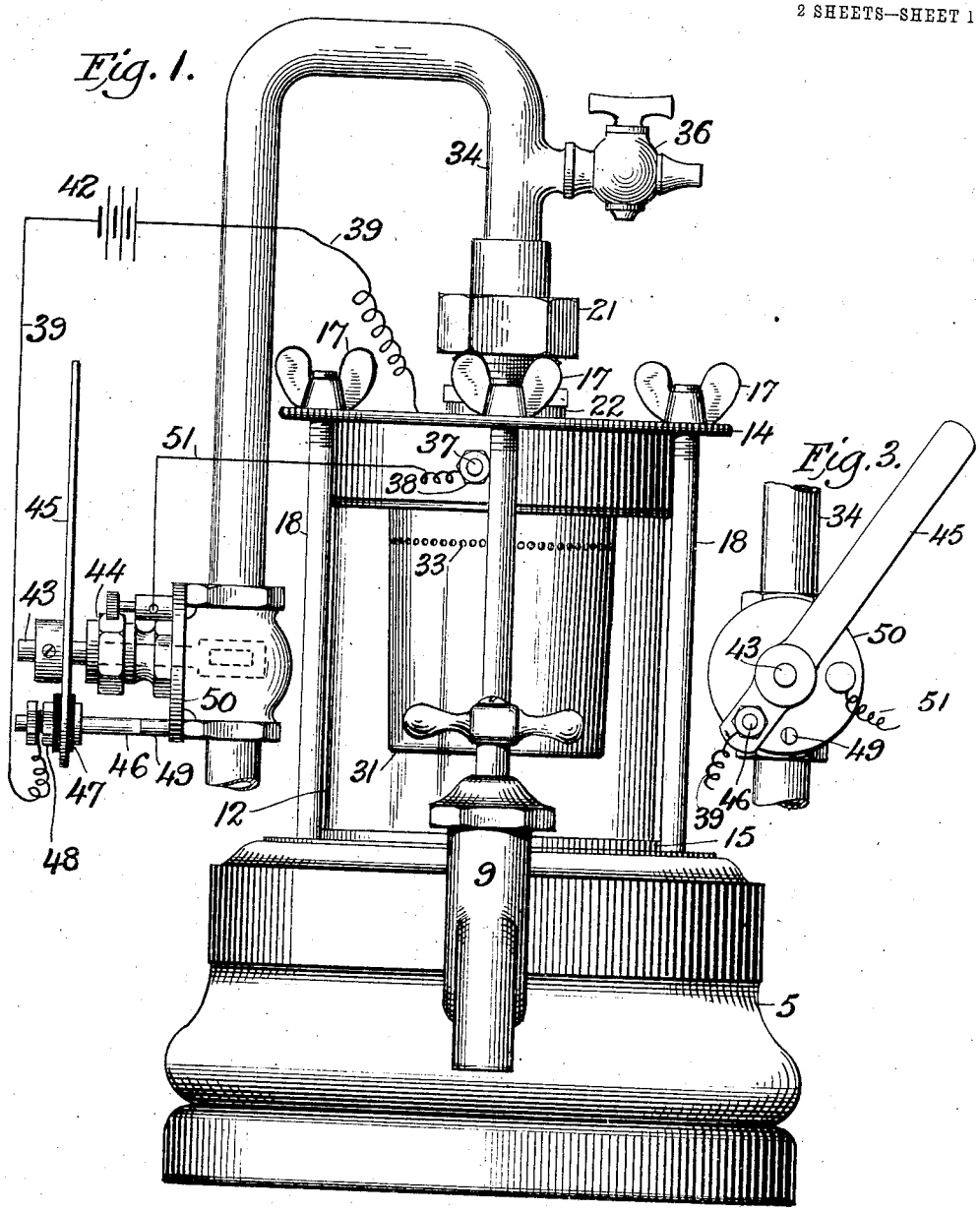

UNITED STATES PATENT OFFICE.

MILTON F. ADAMS, OF NEW YORK, N. Y., ASSIGNOR TO THE ELECTRIC WATER PURIFIER COMPANY, A CORPORATION OF ARIZONA TERRITORY.

LIQUID FILTER AND PURIFIER.

No. 823,019.     Specification of Letters Patent.     Patented June 12, 1906.

Application filed June 10, 1905. Serial No. 264,654.

*To all whom it may concern:*

Be it known that I, MILTON F. ADAMS, a citizen of the United States of America, residing at New York city, county of New York, and State of New York, have invented certain new and useful Improvements in Liquid Filters and Purifiers, of which the following is a specification.

This invention relates to filters and purifiers for water and liquids; and it consists of certain new and novel combinations of filtering means and an electric current whereby the liquid is subjected to the influence of the current while passing through the filtering means, so that the particles of solid matter of the liquid are caused to be attracted to each other and are precipitated and their movement with the water-current checked by the said filtering means, and only the purified and filtered liquid is permitted to be drained off. These and other objects and details of my invention will be more fully described in the following specification and set forth in the appended claims.

In the drawings accompanying this specification and forming a part thereof like reference characters are used to refer to like parts.

Figure 1 is a front elevation of my improved filter. Fig. 2 is a central vertical sectional view of same. Fig. 3 is a side view of the circuit-closing valve. Fig. 4 is a side view of one of the filtering-cups.

The device shown in the drawings is a portable filter adapted to be attached to the supply-cock for family consumption, or it may be used on counters or tables in restaurants and the water-supply pipe lead thereto. The base 5 may be a block of wood, hard rubber, or other material of compact and artistic design and having a circular depression 6 in its upper face and recesses 7 and 8 to accommodate the faucet 9 of ordinary construction and communicating, by means of the pipe 10, with the chamber 11 within the cylinder 12, which, for cleanliness and to exhibit the interior of same, may be made of glass or other transparent substance. The ends of the cylinder 12 are held under compression between two plates 13 and 14, a rubber or similar gasket 15 being interposed between the cylinder and the plate 13, which latter fits within the depression 6. The upper end of the cylinder is also provided with a gasket 16, and these gaskets render the compartment thoroughly water-tight when the thumb-nuts 17 on the tie-rods 18, uniting the plates 13 and 14, are properly adjusted. Beneath the plate 14 and between it and the upper end of the cylinder 12 is a circular block of non-conductive material 19, with a central screw-threaded hole to receive the member 20 of a pipe-coupling 21. This coupling-section 20 also passes through an opening in the plate 14, and a washer 22 is interposed, and when screwed down the coupling member 20 holds the parts 14 and 19 close together. The upper end of pipe 10 has a thimble 10ª, which screws therein and by means of the gasket 15 forms a close and water-tight connection between the pipe and the chamber 11. The block 19 has around its under side near the outer edge a groove for the gasket 16, while about its center it has two depressions of varying depth 23 and 24, with vertical walls which have inwardly-projecting radial pins 25 and 26, respectively.

Within the depression 23 is adapted to fit the upper end of a cup 27, of thin non-corrosive material, preferably metal, and having at each side an angular slot 28, which, in conjunction with the pins 25, form bayonet-joints or means of securing the cup to the block in a suspended position. A series of perforations 29 surround the cup near its upper edge, and within the cup is a coil or cylinder 30, of porous material—such as felt, paper, or cloth—through which the water passes before leaving the cup through the perforations 29.

Within the depression 24 is an identical cup 31, except that its dimensions are slightly greater; but it has the same bayonet-joint connecting means with the pins 26, which hold it within the depression, and it also contains a porous coil 32. Instead of using a bayonet-joint coupling to secure the cups to the block 19 it is obvious that various means may be adopted which may not be necessary to illustrate, and the cups may be inserted and held in place by means of screw-threads formed in their upper ends, and similar threads will be cut in the walls of the depressions to receive same. Perforations 33 also surround the upper edge of the cup, and in both the cups the porous coil extends above the line of the perforations, so that water or other liquids entering the inner cup 27 through the supply-pipe 34 can only pass out of the perforations through the porous coil, and with the outer cup the case is the same. The supply-pipe 34 is provided with an enlargement 35 at its end, and the same is held within the coupling 20·21, and the pipe may also have a tap 36 to draw off the liquid before passing through the filter.

Through the block 19 from its outside edge to the wall of the depression 23 runs a wire or pin 37, whose inner end makes contact with the cup 27 and whose outer end has binding-nuts 38 to attach the wire of an electric circuit 39. A similar pin 40 also passes into the block and has its inner end terminating in the wall of the recess 24, where it makes contact with the cup 31 when in place. Binding-nuts 41 are provided for the outer end of the pin 40 to secure the wire of the circuit 39, which is provided with a battery 42 or other source of electricity and has in it a switch which also serves as a valve for the admission of liquid to the supply-pipe 34.

The combined valve and switch is shown in Figs. 1 and 3, and the valve-stem 43 passes through a stuffing-box 44 and has secured to its outer end the lever 45, carrying at its lower end a lateral pin 46, insulated from the lever by the non-conductive bushing 47 and having the binding-nuts 48 to attach to it the wire of the circuit 39. When the lever is swung so as to open the valve and permit of the passage of liquid into the pipe 34, the pin 46 comes in contact with a stud 49, projecting from a conducting-disk 50 on the side of the valve, and completes the electric circuit through the disk 50, a short wire 51, connecting same with the contact-pin 37, the cup 27, through the liquid, the cup 31, the pin 40, through the wire 39 and battery 42 to the pin 46.

Instead of the coils of felt or similar material it is obvious that any suitable filtering means may be used, such as sand or charcoal, filling the cups 27 and 31. Other forms of cups may also be used, such as wire-gauze, to permit of a more rapid flow of the liquid.

With the opening of the supply-valve and the closing of the electric circuit the current flows through the various metallic connections and from one of the cups 27 and 31 to the other through the liquid in the cup 31, causing organic substances to be attracted toward each other and cease to be held in suspension in the water and to be precipitated and arrested by the filtering means while the purified and filtered water passes off through the perforations in the cup 31 for consumption. When it is desired to clean the filter, the nuts 17 are unscrewed and the plate 14 removed. The block 19 may then be lifted and the cups removed to remove any accumulation of sediment or deposit.

A filter and purifier constructed in accordance with my invention may be made an attractive and artistic device for household use and readily operated and attended to by persons of limited mechanical or electrical knowledge.

Having described my invention, what I claim as new, and desire to secure by Letters Patent, is—

1. In a filter and purifier for liquids, the combination with perforated electrodes, one adapted to fit within the other, of filtering means in the space between the electrodes, inlet means for entering one of the electrodes and outlet means leading from the other electrode, an electric current, and means for simultaneously permitting the flow of liquid through the inlet means and closing the electric circuit.

2. In a filter and purifier for liquids, the combination with cup-shaped perforated electrodes one adapted to fit within the other, of filtering means within and between the electrodes, inlet means controlled by a valve for supplying liquid to one of the electrodes, outlet means for the other electrode, and means for simultaneously opening the inlet-valve and closing the electric circuit.

3. In a filter and purifier for liquids, the combination with the cup-shaped perforated electrodes one adapted to fit within the other, of filtering means within and between the electrodes, an electric circuit normally open, and means for simultaneously opening the supply-pipe to the filter and closing the electric circuit.

4. In a filter and purifier for liquids, the combination with a casing containing the filtering-chamber, heads for the casing, water-tight means for the heads, a non-conductive block on one of the heads, perforated cup-shaped electrodes secured to the block, filtering means within and between the electrodes, a liquid-supply pipe entering one of the electrodes, an electric circuit connected with the electrodes, and means for simultaneously opening and closing the liquid-supply pipe and the electric circuit.

5. In a filter and purifier for liquids, the combination with a casing, of a non-conductive block at one end, heads at each end of the casing, water-tight means, a liquid-supply pipe entering one of the heads and the block, perforated cup-shaped electrodes secured to the block and containing the filtering means, an electric circuit having each of its terminals connected with one of the cups, a valve for the supply-pipe, and a lever on the valve-stem adapted to close the electric circuit when the valve is opened.

6. In a filter and purifier for liquids, the combination with a cylindrical casing, of heads with water-tight packing, inlet and outlet means in the heads, a non-conductive block in one of the heads and having depressions with radial pins, perforated metallic cups with angular slots at their upper edges adapted to engage the radial pins and secure them within one or the other depression, electric contacts in the walls of the depressions each to engage a cup, an electric circuit embracing the contacts, a circuit-closer operated by the inlet means and filtering means carried by the cups.

7. In a filter and purifier for liquids, the combination with a transparent casing having heads and packing means, tie-bolts with thumb-nuts uniting the heads, a non-conductive block in the upper head having electric connections with the outside, perforated metallic cups adapted to be contained one within the other, be suspended from the non-conductive block and each make contact with one of the electric connections on the inside of the casing, filtering means within the perforated cups, an electric circuit embracing the cups and their connections, a switch in the circuit, inlet and outlet means and means connected with the switch for opening the liquid-inlet when the circuit is closed.

In testimony whereof I have signed my name to this specification, in the presence of two subscribing witnesses, this 6th day of June, 1905.

MILTON F. ADAMS.

Witnesses:
   JAMES F. DUHAMEL,
   H. G. HOSE.